United States Patent Office.

IMPROVEMENT IN MAKING BUTTER FROM CHEESE-WHEY.

HOMER C. MARKHAM, OF WEST TURIN, NEW YORK, ASSIGNOR TO HIMSELF AND CHARLES G. RIGGS, OF ~~SAME PLACE.~~ Turin, N.Y.

Letters Patent No. 60,399, dated December 11, 1866.

---

The Schedule referred to in these Letters Patent and making part of the same.

---

Be it known that I, HOMER C. MARKHAM, of West Turin, in the county of Lewis, and State of New York, have invented a mode or process of manufacturing good Table Butter from the whey, after making the common English or American cheese, as ordinarily made by the dairymen in the United States; and I do hereby declare that the following is a full and exact description of the process of such manufacture.

1. After the usual method of cheese-making, the curd having been separated from the whey, when the whey is put into a kettle or vat, then add one gallon of acid and one pound of common dairy salt to the quantity that comes from four hundred and fifty pounds of milk; then heat it to a temperature of from two hundred to two hundred and twelve degrees, when the cream rises, and is taken off with a skimmer, which is put in a cool place and kept until the next day, and then churned in the ordinary manner, at a temperature of fifty-six to sixty-eight degrees, and it will produce three pounds of butter, (which, when salted and worked over in the usual manner, is fit for table use,) and in like proportion to the quantity of milk used in the making of cheese.

2. The acid is made by taking any quantity of common whey, at the commencement of the cheese-making season, boiling it five or ten minutes; it is kept one week, becomes quite sour, and is ready for use, as acid.

3. Take ten gallons of common whey, add one gallon of first made acid, boil three to five minutes, when a second curd (so called) will rise; is to be taken off; what remains in kettle is the acid, and is ready for use, as mentioned in first specification; which process of making the acid is to be repeated every second day, or every day, if necessary.

I am aware that butter has been made from whey, as described in the Patent of KILLIAN EDGGER; but his process being more expensive, takes more time, and will produce but about half as much butter as mine.

What I claim, and desire to secure by Letters Patent of the United States, is—

The separation of cream or butter from whey by means of heat, and in the use of an acid liquid, substantially as herein described.

HOMER C. MARKHAM.

Witnesses:
    WM. P. WILLIAMS,
    E. W. EVERETT.